(12) United States Patent
Asnis et al.

(10) Patent No.: US 10,805,658 B2
(45) Date of Patent: Oct. 13, 2020

(54) ADAPTIVE SWITCHING IN A WHOLE HOME ENTERTAINMENT SYSTEM

(71) Applicant: Roku, Inc., Los Gatos, CA (US)

(72) Inventors: Ilya Asnis, San Jose, CA (US);
Anthony John Wood, Palo Alto, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 16/128,565

(22) Filed: Sep. 12, 2018

(65) Prior Publication Data

US 2020/0084491 A1    Mar. 12, 2020

(51) Int. Cl.

| | |
|---|---|
| *H04N 21/2662* | (2011.01) |
| *H04N 21/258* | (2011.01) |
| *H04L 12/825* | (2013.01) |
| *H04N 21/2368* | (2011.01) |
| *H04N 21/238* | (2011.01) |
| *H04N 21/234* | (2011.01) |
| *H04N 21/4367* | (2011.01) |

(52) U.S. Cl.
CPC ......... *H04N 21/2662* (2013.01); *H04L 47/25* (2013.01); *H04N 21/2368* (2013.01); *H04N 21/23406* (2013.01); *H04N 21/23805* (2013.01); *H04N 21/25825* (2013.01); *H04N 21/4367* (2013.01)

(58) Field of Classification Search
CPC ......... H04N 21/2662; H04N 21/23406; H04N 21/2368; H04N 21/23805; H04N 21/25825; H04N 21/4367; H04L 27/42; H04L 47/25

See application file for complete search history.

(56) References Cited

U.S. PATENT DOCUMENTS

| | | | |
|---|---|---|---|
| 8,665,370 B2 * | 3/2014 | Lin | ................. H04N 5/60 348/515 |
| 8,873,928 B2 | 10/2014 | Lim et al. | |

(Continued)

FOREIGN PATENT DOCUMENTS

| | | |
|---|---|---|
| KR | 10-1482515 B1 | 1/2015 |
| KR | 10-1535827 B1 | 7/2015 |

(Continued)

OTHER PUBLICATIONS

"Relative Timing of Sound and Vision for Broadcasting," Recommendation ITU-R BT.1359, 3 pages, 1998.

(Continued)

*Primary Examiner* — James R Sheleheda
(74) *Attorney, Agent, or Firm* — Sterne, Kessler, Goldstein & Fox P.L.L.C.

(57) ABSTRACT

Provided herein are system, apparatus, article of manufacture, method and/or computer program product embodiments, and/or combinations and sub-combinations thereof, for synchronizing playback of audio and video associated with a content, such as a movie or TV show. Also provided herein are system, apparatus, article of manufacture, method and/or computer program product embodiments, and/or combinations and sub-combinations thereof, for coordinating devices in a whole home entertainment system that includes a wireless network, to improve collective utilization of the wireless network and thereby enhance user experience.

20 Claims, 6 Drawing Sheets

(56) References Cited

U.S. PATENT DOCUMENTS

| | | | |
|---|---|---|---|
| 10,243,871 B1* | 3/2019 | Patel | H04L 43/0894 |
| 2005/0021830 A1* | 1/2005 | Urzaiz | H04L 47/10 |
| | | | 709/234 |
| 2006/0026294 A1* | 2/2006 | Virdi | H04N 21/658 |
| | | | 709/232 |
| 2006/0161835 A1* | 7/2006 | Panabaker | H04N 21/4325 |
| | | | 715/203 |
| 2009/0147829 A1* | 6/2009 | Zhodzishsky | H04L 1/0002 |
| | | | 375/134 |
| 2010/0189063 A1* | 7/2010 | Kokku | H04L 47/32 |
| | | | 370/329 |
| 2011/0274156 A1* | 11/2011 | Mighani | H04N 21/2381 |
| | | | 375/240.02 |
| 2011/0276710 A1* | 11/2011 | Mighani | H04L 65/605 |
| | | | 709/231 |
| 2012/0182383 A1 | 7/2012 | Kee | |
| 2012/0311173 A1* | 12/2012 | Agarwal | H04L 43/0829 |
| | | | 709/231 |
| 2013/0091297 A1* | 4/2013 | Minder | H04L 65/80 |
| | | | 709/231 |
| 2013/0117792 A1* | 5/2013 | Khouzam | H04N 21/64738 |
| | | | 725/109 |
| 2014/0258463 A1* | 9/2014 | Winterrowd | H04L 65/4092 |
| | | | 709/219 |
| 2014/0280764 A1* | 9/2014 | Dasher | H04L 65/4084 |
| | | | 709/219 |
| 2014/0281000 A1* | 9/2014 | Dattagupta | H04L 65/605 |
| | | | 709/231 |
| 2014/0344443 A1* | 11/2014 | MacInnis | H04L 67/00 |
| | | | 709/224 |
| 2015/0249623 A1* | 9/2015 | Phillips | H04L 41/50 |
| | | | 709/219 |
| 2015/0281740 A1* | 10/2015 | Tsukagoshi | H04N 19/46 |
| | | | 375/240.02 |
| 2015/0281746 A1* | 10/2015 | Lam | H04N 21/231 |
| | | | 725/116 |
| 2015/0326941 A1* | 11/2015 | Gao | H04N 21/4402 |
| | | | 725/74 |
| 2016/0309213 A1* | 10/2016 | Du | H04N 21/4307 |
| 2016/0360285 A1* | 12/2016 | Khouzam | H04N 21/4621 |
| 2017/0069338 A1* | 3/2017 | Elliot | H04N 21/4307 |
| 2017/0094319 A1* | 3/2017 | Park | H04N 21/23439 |
| 2017/0251039 A1* | 8/2017 | Hoffert | H04N 21/44016 |
| 2017/0324676 A1* | 11/2017 | Dasher | H04N 21/2402 |
| 2018/0077443 A1* | 3/2018 | Lau | H04N 5/04 |
| 2018/0124719 A1* | 5/2018 | Kim | H04L 65/607 |
| 2018/0176624 A1* | 6/2018 | Phillips | H04L 12/1403 |
| 2018/0192122 A1* | 7/2018 | Rajapakse | H04N 21/44227 |
| 2018/0248806 A1* | 8/2018 | Burnley | H04L 1/0014 |
| 2018/0351868 A1* | 12/2018 | Cartwright | H04N 21/4621 |
| 2019/0089761 A1 | 3/2019 | Lee | |
| 2019/0149874 A1* | 5/2019 | Lau | H04N 21/44004 |
| | | | 725/74 |
| 2019/0173931 A1* | 6/2019 | Gordon | H04N 21/23439 |
| 2019/0214034 A1* | 7/2019 | Boehlke | H04L 47/2416 |

FOREIGN PATENT DOCUMENTS

| | | |
|---|---|---|
| KR | 10-1538114 B1 | 7/2015 |
| WO | WO-2017/200319 A1 | 11/2017 |

OTHER PUBLICATIONS

U.S. Appl. No. 16/128,624, filed Sep. 12, 2018, entitled "Dynamically Adjusting Video to Improve Synchronization With Audio."

International Search Report and Written Opinion of the International Searching Authority directed to related International Patent Application No. PCT/US2019/050316, dated Dec. 24, 2019; 11 pages.

* cited by examiner

ADAPTIVE SWITCHING IN A WHOLE HOME ENTERTAINMENT SYSTEM

CROSS REFERENCE TO RELATED APPLICATIONS

This application is related to U.S. patent application Ser. No. 16/128,624 titled "Dynamically Adjusting Video To improve Synchronization With Audio," filed Sep. 12, 2018, which is herein incorporated by reference in its entirety.

BACKGROUND

Field

This disclosure is generally directed to adaptively switching among video encodings in a whole home entertainment system having wireless speakers for playing audio, where the video encodings and audio are associated with content, such as a movie or TV show.

Background

When playing content on a TV, such as a movie or TV show, the playback of audio should be synchronized with the playback of the corresponding video. Otherwise, the user's viewing experience can be greatly diminished.

But, synchronizing audio and video can be a challenge with whole home entertainment systems where a wireless network is used to provide content to the TV, and the same wireless network is used to transmit audio associated with the content to wireless speakers. In such environments, playback of the audio may not be in sync with the video due to transmission delays caused by the wireless network. This technical problem has been exacerbated by the advent of high definition (HD) video (such as 4K and even higher quality video), since wirelessly transmitting such massive amounts of video data pushes the capabilities of the wireless network.

SUMMARY

Provided herein are system, apparatus, article of manufacture, method and/or computer program product embodiments, and/or combinations and sub-combinations thereof, for synchronizing playback of audio and video associated with a content, such as a movie or TV show. Accordingly, embodiments described herein endeavor to provide a synchronized, uninterrupted (that is, little or no audio dropouts) playback experience with reduced (or minimum) end-to-end latency between the video playback device (such as a TV) and the audio playback device (such as a speaker).

Some embodiments operate by: analyzing a wireless network to characterize a current state of the wireless network; based on the analysis, selecting a video encoding associated with the content; requesting the content from a content source, wherein the requested content comprises the selected video encoding and the audio; receiving the requested content from the content source via the wireless network; buffering the video encoding in a buffer; transmitting the audio to wireless speakers via the wireless network; playing the video encoding on a display device from the buffer; playing the audio on the wireless speakers; and repeating the foregoing to adaptively switch between video encodings of the content based on the current state of the wireless network, to thereby maintain synchronization of playback of the audio and video.

Also provided herein are system, apparatus, article of manufacture, method and/or computer program product embodiments, and/or combinations and sub-combinations thereof, for coordinating devices in a whole home entertainment system that includes a wireless network, to improve collective utilization of the wireless network and thereby enhance user experience.

Some embodiments operate by: analyzing a wireless network to characterize a current state of the wireless network; based on the analysis, performing one or more actions to coordinate operation of electronic devices in the whole home entertainment system to thereby improve collective utilization of the wireless network, and causing the electronic devices to operate according to the actions. The actions include any combination of:

- requiring that content be obtained from a source that does not require the wireless network for delivery;
- requiring that a lower resolution video encoding of content be requested, when the content is to be delivered via the wireless network;
- requiring that internal speakers or wired external speakers be used for audio playback; and
- requiring that a lower resolution encoding of audio be used, when the audio is to be transmitted via the wireless network to wireless speakers.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
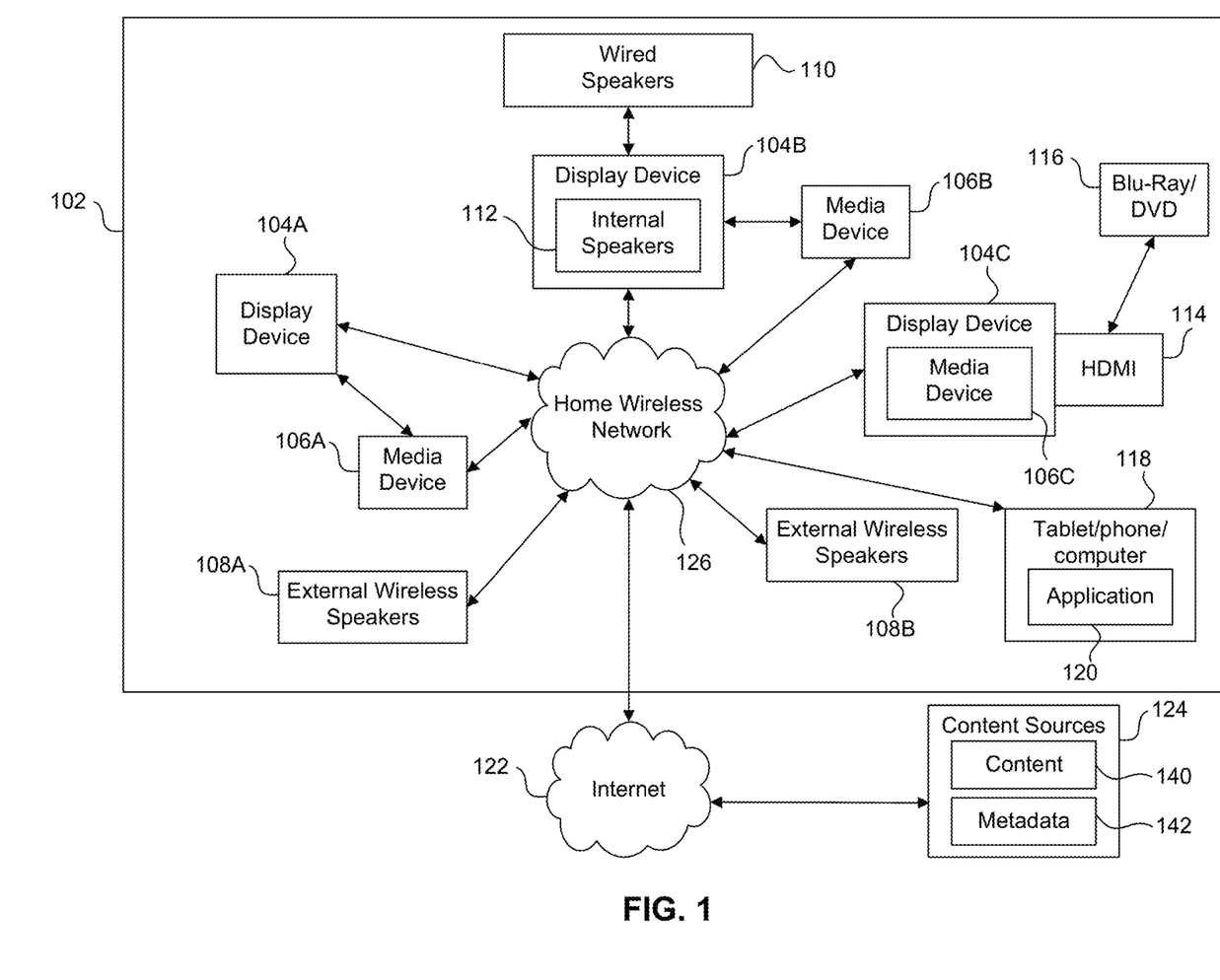
FIG. 1 illustrates a block diagram of a whole home entertainment system, according to some embodiments.

FIG. 1 illustrates a block diagram of a whole home entertainment system 102, according to some embodiments. In a non-limiting example, whole home entertainment system 102 is directed to playing content such as movies, TV shows, games, audio books, and music, to name just some examples. System 102 may be located in a user's home or any other location, such as a business, a park, a stadium, a restaurant, a bar, or a government office, to name just some examples.

Whole home entertainment system 102 may include one or more display devices 104. Each display device 104 may include a video display (not shown) for playing video associated with content. Also, at least some of the display devices 104 may include internal speakers 112 for playing audio associated with content. Display devices 104 may be any combination of monitors, televisions (TVs), computers, smart phones, tablets, wearables (such as a watch), appliances, and/or projectors, to name just some examples.

Each display device 104 may be connected to a media device 106. Each media device 106 may be separate from its respective display device 104, or may be part of or integrated with the display device 104.

Each media device 106 may be a streaming media device that may stream content from content sources 124, and may provide such content to its respective display device 104 for playback to users. For example, a given media device 106 may communicate via a home (or local) wireless network 126 to stream content from content sources 124 via the Internet 122. Wireless network 126 may be any wireless network, wireless medium or communication protocol such as WIFI, Bluetooth, infrared, cellular, etc., or any combination thereof.

Each content source 124 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form. Metadata 142 may include data about content 140. For example, metadata 142 may include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

Each display device 104 may receive content for playback from any number of other devices, such as a Blu-Ray/DVD player 116 connected via a HDMI port 114. Each display device 104 may also or alternatively wirelessly receive content from devices over the home wireless network 126, such as from tablets, computers and/or phones 118.

As noted above, some or all of display devices 104 may include internal speakers 112, and may play audio associated with content using the internal speakers 112. Additionally or alternatively, at least some display devices 104 may play audio using external speakers. In some embodiments, external speakers are wireless speakers 108 that wirelessly communicate with the display devices 104 and/or media devices 106 via the home wireless network 126. It is noted that, while embodiments are described herein as operating with speakers, this disclosure is not so limited. Instead, embodiments may operate with any electronic device that is enabled for wireless communication (either directly or through another device) and useable for audio playback, such as but not limited to soundbars, TVs, set top boxes, computers, tablets, phones, appliances, internet of things (JOT) devices, wearables, digital assistants, etc.

Figure 2:
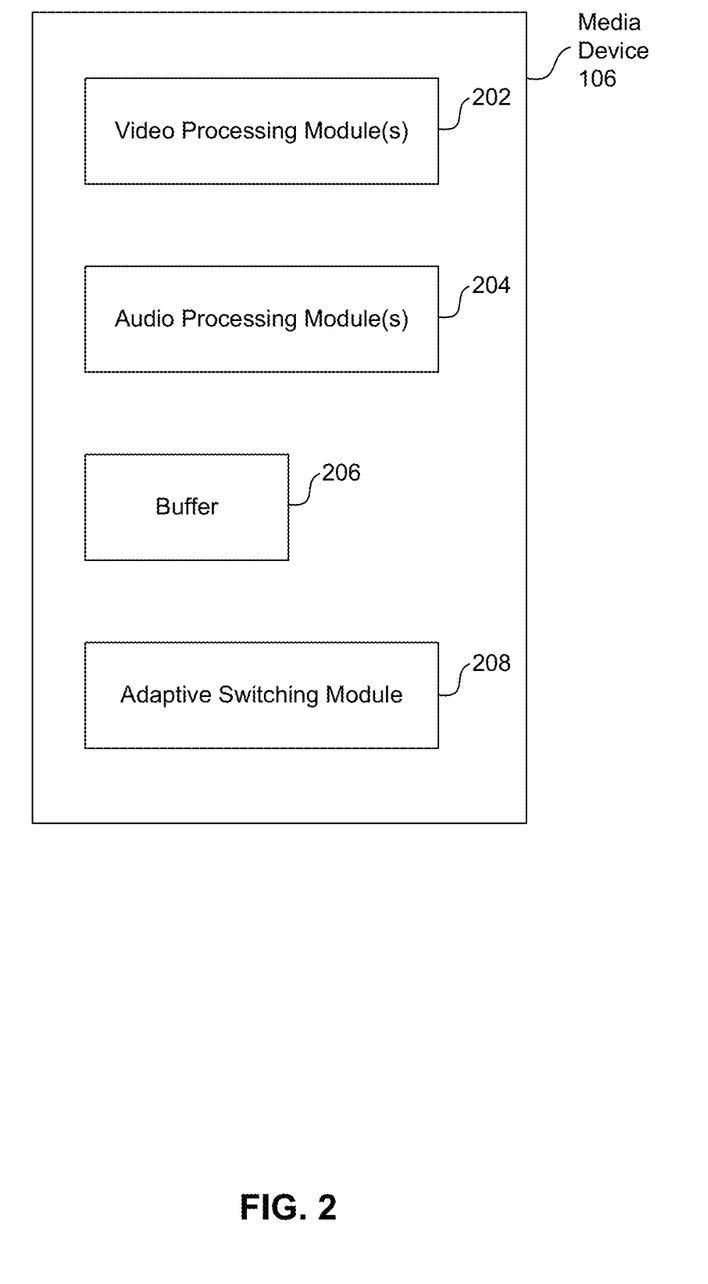
FIG. 2 illustrates a block diagram of a display device, according to some embodiments.

FIG. 2 illustrates an example media player 106, according to some embodiments. The media player 106 may include one or more video processing modules 202, and one or more audio processing modules 204.

Each video processing module 202 may be configured to decode, encode and/or translate video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video processing module 202 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Similarly, each audio processing module 204 may be configured to decode, encode and/or translate audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Media device 106 may also include buffer 206 for buffering video, as well as other types of data. The size of the buffer 206 may be implementation dependent and may depend on the amount of video that is desired to be stored. For example, to buffer one minute of video at 720p at 30 frames per second (FPS), the buffer 206 may be at least 60 megabytes (MB). To buffer one minute of video at 1080p at 30 FPS, the buffer 206 may be at least 130 MB. To buffer one minute of video at 4K at 30 FPS, the buffer 206 may be at least 375 MB.

Media device 106 may also include an adaptive switching module 208. The operation of the adaptive switching module 208 is described below.

In some embodiments, any of display devices 104 may also or alternatively include video processing modules 202, audio processing modules 204, buffers 206, and/or adaptive switching modules 208. Accordingly, any of display device (s) 104 may also or alternatively perform the functions of media device(s) 106 described herein, and the reverse is also true.

As noted above, some display devices 104 may play audio associated with content using wireless speakers 108 by wirelessly transmitting the audio to wireless speakers 108 via the home wireless network 126. In some embodiments, the audio may be wirelessly transmitted via the home wireless network 126 by the corresponding media device 106 rather than the display device 104.

In the whole home entertainment system 102, a technical problem may exist because the wireless speakers 108 may be delayed in receiving the audio due to latencies, delays and/or other issues related to the home wireless network 126. Such delays may result in the playback of the video by a display device 104 being out of sync with the playback of the audio on the wireless speakers 108. That is, playback of the audio may lag playback of the video. Such unsynchronized audio and video playback may greatly degrade the user's viewing experience of the content. This technical problem has been exacerbated by the advent of high definition (HD) video (such as 4K and even higher quality video), since wirelessly transmitting such massive amounts of video data may challenge the capabilities of the home wireless network 126.

In some cases, this technical problem may be addressed by buffering the video at the display device 104 and/or the media device 106 (using buffer 206) prior to playback of the video on the display device 104. Such operation is shown in method 302 of FIG. 3. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 302 shall be described with reference to FIGS. 1 and 2. However, method 302 is not limited to those example embodiments.

Figure 3:
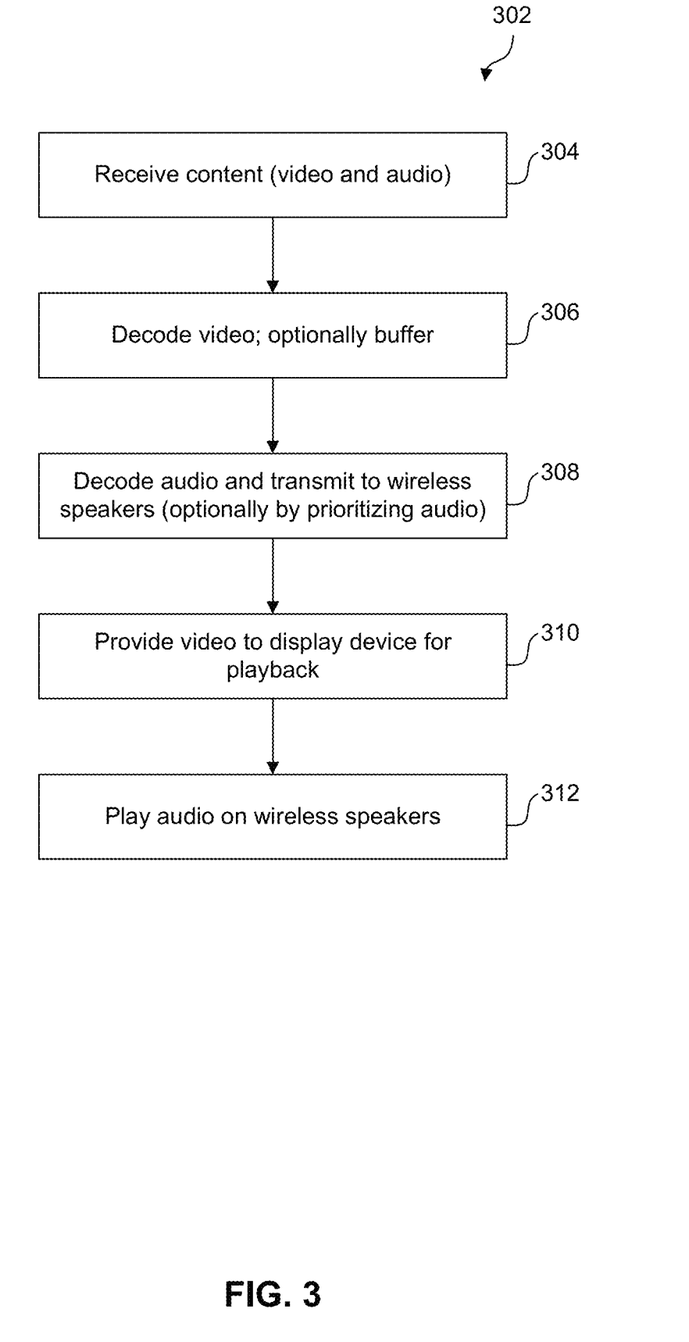
FIG. 3 illustrates a flowchart for playing video and audio associated with content (such as a movie or TV show) in a whole home entertainment system, where wireless speakers are used to play the audio, according to some embodiments.

In 304, a media device 106 (such as, for example purposes, media device 106A) may receive content (that includes both video and audio) via the home wireless network 126 from a source, such as from tablet/computer/phone 118 and/or content source 124.

In 306, the media device 106A may decode the video using video processing module(s) 202, and may buffer the decoded video in buffer 206 to compensate for the expected delay in transmitting the audio to wireless speakers 108 (such as, for example purposes, wireless speakers 108A) via the home wireless network 126.

In 308, the media device 106A may decode the audio using audio processing module(s) 204, and may transmit the decoded audio to wireless speakers 108A via the home wireless network 126. It is noted that step 308 may be performed before, or simultaneously with, step 306.

In some embodiments, the media device 106A may prioritize the transmission of the audio to wireless speakers 108A over home wireless network 126. The media device 106A may utilize any well-known approach or technique to implement such prioritization. For example, if the wireless network 126 is a WIFI network, traffic may be prioritized in a well-known manner based on MAC address or IP address. Also or alternatively, traffic may be prioritized by transmitting the audio without waiting the standard delay(s) associated with WIFI protocols.

In 310, the media device 106A may provide the video from the buffer 206 to the associated display device 104A for playback. Also, in 312, the audio may be played by the wireless speakers 108A. Because playback of the video was delayed by buffering in the buffer 206, playback of the audio and video is synchronized. But, this synchronization will be achieved only if the buffering was for an amount equal to (or substantially equal to) the transmission delay caused by the home wireless network 126. This approach may not be possible with HD video such as 1080p and 4 K. Because such HD video is composed of a large amount of data, the buffer 206 may not be large enough to store enough video to compensate for the transmission delay caused by the home wireless network 126. (Note that this technical problem does not exist when the content is being obtained from a source that is directly connected to a display device 104, such as Blu-Ray/DVD player 116 connected to display device 104C via HDMI port 114.)

Embodiments of this disclosure employ various techniques to address and solve this technical problem. For example, some embodiments dynamically adjust the resolution of the video being requested and received over the home wireless network 126 (from tablet/computer/phone 118 and/or content source 124, for example) based on the current condition of the home wireless network 126. In particular, some embodiments request a lower resolution encoding of the video (such as, for example, 1080p or 720p rather than 4K) based on the current condition of the home wireless network 126. Such operation is depicted in method 402 of FIG. 4.

Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 402 shall be described with reference to FIGS. 1 and 2. However, method 402 is not limited to those example embodiments.

Figure 4:
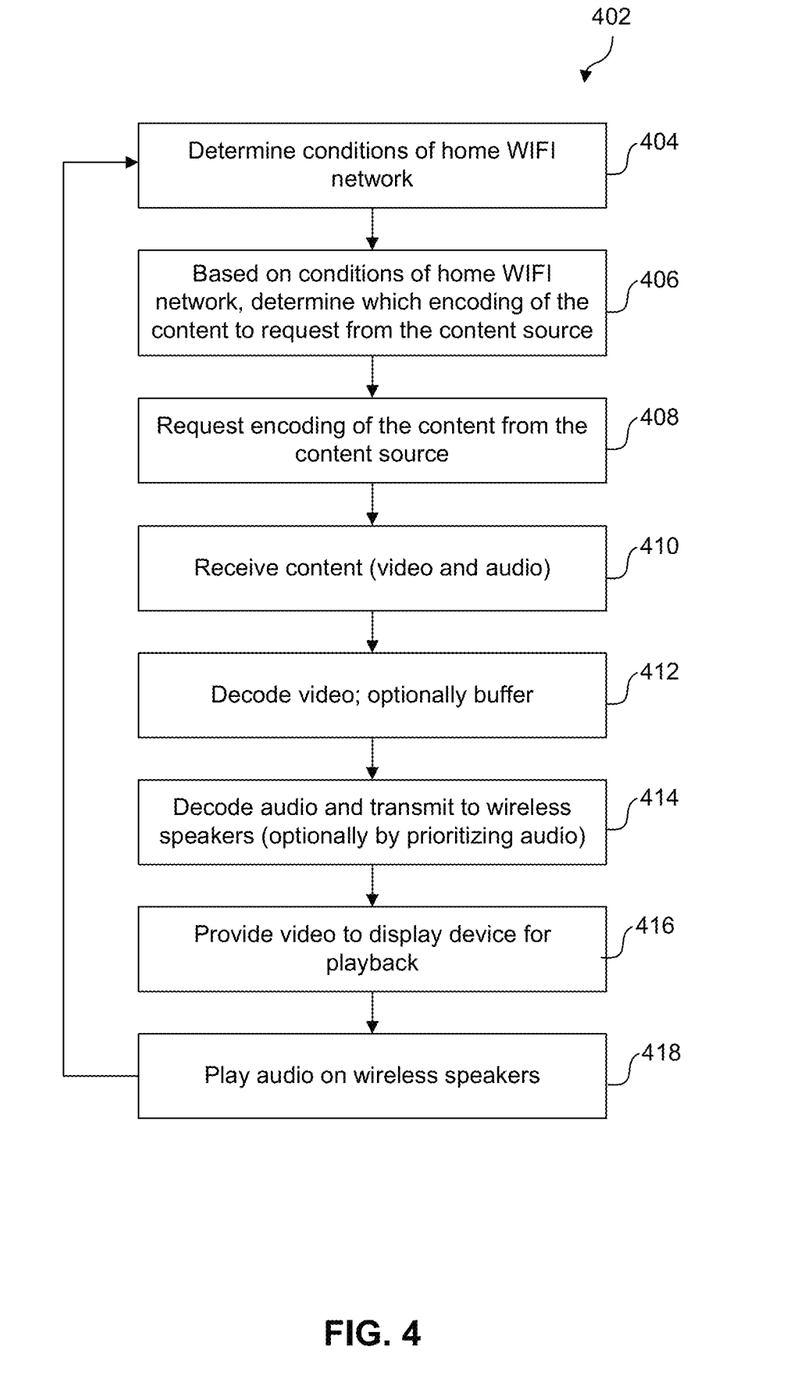
FIG. 4 illustrates a flowchart for adaptively switching among video encodings in a whole home entertainment system having wireless speakers for playing audio, where the video encodings and audio are associated with content, according to some embodiments.

In 404, the adaptive switching module 208 in a media device 106 (such as, for example purposes, media device 106A) may analyze the home wireless network 126 to determine and characterize the wireless link between its media device 106A (or the corresponding display device 104A) and the wireless speakers 108 being used by the media device 106A to play audio (assume, for example purposes, that the media device 106A is using wireless speakers 108A to play audio). To perform this function, the adaptive switching module 208 may use any well-known techniques, algorithms, services, tools, modules and/or approaches for evaluating the state and condition of a wireless medium, and may take into consideration factors such as bandwidth, traffic, congestion, collisions, latency, utilization, signal strength, the number of devices on a given channel, etc.

For example, the adaptive switching module 208 may monitor the traffic over the link between the media device 106A and the wireless speakers 108A for the presence or absence of acknowledgements (ACKS) sent by the wireless speakers 108A after successful receipt of frames containing audio data. As will be appreciated by persons skilled in the relevant art(s), the presence or absence of such ACKS can be analyzed by the adaptive switching module 208 to at least partially determine and characterize the wireless link between the media device 106A and the wireless speakers 108A.

In performing step 404, the adaptive switching module 208 may take into consideration the potential impact on the home wireless network 126 of downloading various video encodings having different resolutions of the same content, such as 4K versus 1080p versus 720p, etc. As will be appreciated by persons skilled in the relevant art(s), downloading higher definition encodings is more likely to cause transmission delays over the home wireless network 126, relative to downloading lower definition encodings.

In 406, based on the current state of the wireless link between the media device 106A and the wireless speakers 108 (as determined in step 404), the adaptive switching module 208 may select an encoding of the video to request from the content source (such as content source 124 or tablet/phone/computer 118). The adaptive switching module 208, in step 406, may select a video encoding that would not cause transmission delays over the home wireless network 126 (that is, the link between the media device 106A and the wireless speakers 108A) in excess of the buffering capacity of buffer 206. For example, if the buffer 206 can buffer one second of a particular video encoding (of a given resolution), then the adaptive switching module 208 would select that video encoding only if downloading such encoding over the home wireless network 126 would cause transmission delays between the media device 106A and the wireless speakers 108A of less than one second.

As will be appreciated by persons skilled in the relevant art(s), audio that is out of sync with video by a small amount (such as 50-100 milliseconds) is not perceivable by most humans. This may be called herein the threshold of non-perception. Thus, in the above example, the adaptive switching module 208 in 406 would select a given encoding of video only if downloading such encoding over the home wireless network 126 would cause transmission delays between the media device 106A and the wireless speakers 108A of less than one second plus the threshold of non-perception (that is, one second plus 50-100 milliseconds, in the above example).

In some cases, buffering may not be available at either the media device 106A or the corresponding display device 104A. In such cases, the adaptive switching module 208 in 406 would select a given encoding of video only if downloading such encoding over the home wireless network 126 would cause transmission delays between the media device 106A and the wireless speakers 108A of less than the threshold of non-perception.

In 408, the adaptive switching module 208 may request content having the selected video encoding from the content source (such as content source 124 or tablet/phone/computer 118).

In 410, the media device 106A may receive the requested content (that includes both video and audio) via the home wireless network 126 from the content source.

In 412, the media device 106A may decode the video using video processing module(s) 202, and may buffer the decoded video in buffer 206 to compensate for the expected delay in transmitting the audio to wireless speakers 108A via the home wireless network 126.

In 414, the media device 106A may decode the audio using audio processing module(s) 204, and may transmit the decoded audio to wireless speakers 108A via the home wireless network 126. It is noted that step 414 may be performed before, or simultaneously with, step 412. In some embodiments, the media device 106A may prioritize the transmission of the audio to wireless speakers 108A over home wireless network 126, as described above.

In 416, the media device 106A may provide the video from the buffer 206 to the associated display device 104A for playback. Also, in 418, the audio may be played by the wireless speakers 108A. Because the video encoding was selected (in steps 406 and 408) based on the current state of the wireless link between its media device 106A and the wireless speakers 108 (and also optionally because the video was buffered in step 412), playback of the audio and video is synchronized.

After step 418, control may return to step 404, wherein the condition of the home wireless network 126 may be reevaluated. Then, based on this reevaluated, current condition of the wireless network 126, the video encoding being requested and downloaded from the content source may be adjusted (in steps 406 and 408). In other words, either a lower or higher resolution encoding of the video may be requested from the content source. In this manner, embodiments adaptively and continuously switch between video encodings, so as to maintain synchronization of audio and video playback.

In some embodiments, such switching between video encodings may occur at 2 second intervals of the video, since video is typically encoded in 2 second chunks. More generally, such switching between video encodings may occur at the encoding granularity of the video, whether it be 2 second chunks or some other size.

This disclosure is directed to other embodiments (in combination with the embodiments discussed herein) for synchronizing the playback of audio and video, such as those described in U.S. patent application Ser. No. 16/128,624 titled "Dynamically Adjusting Video To Improve Synchronization With Audio," filed Sep. 12, 2018, which is herein incorporated by reference in its entirety.

As shown in the example of FIG. 1, whole home entertainment systems 102 may include more than one display device 104. Some of the display devices 104 may use internal speakers 112 for audio playback (such as display device 104B), and some may use external wireless speakers 108 (such as display devices 104A and 104C). Some display devices 104 may receive content via the home wireless network 126 (such as display devices 104A and 104B), and some may, at times, receive content from wired sources (such as display device 104C connected to Blu-Ray/DVD player 116).

According to some embodiments, the adaptive switching modules 208 in the media devices 106 may coordinate their operations so as to improve the collective utilization of the wireless network 126. Such operation is shown in method 502 of FIG. 5. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 502 shall be described with reference to FIGS. 1 and 2. However, method 502 is not limited to those example embodiments.

Figure 5:
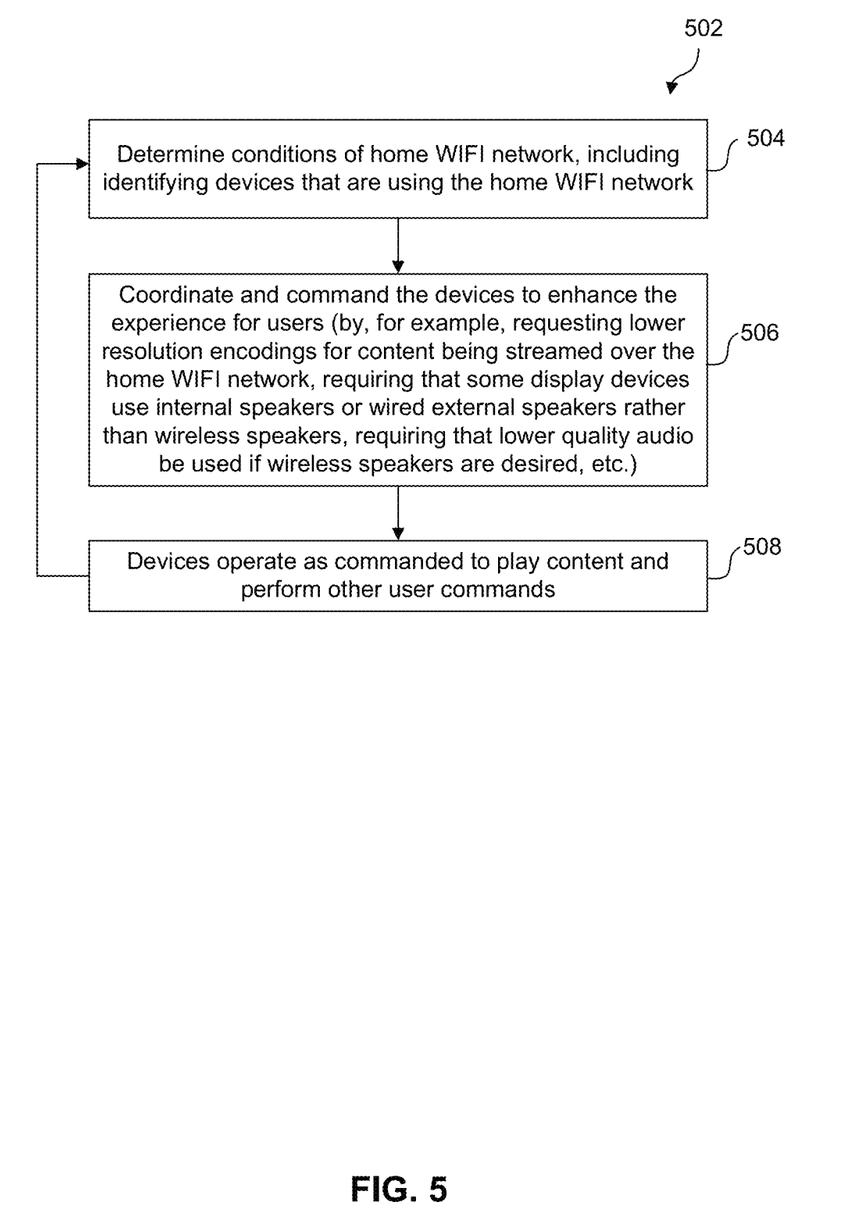
FIG. 5 illustrates a flowchart for coordinating the operation of devices in a whole home entertainment system (such as TVs, media players, wireless speakers, etc.), where at least some of the devices are wirelessly communicating with each other over a wireless network, to improve the collective utilization of the wireless network, according to some embodiments.

In 504, the adaptive switching module 208 in a media device 106 may analyze the home wireless network 126 to determine and characterize the home wireless network 126, including for example determining and characterizing any or all of the wireless links between the media devices 106 (or their respective display devices 104) and the wireless speakers 108 in the whole home entertainment system 102. To perform this function, the adaptive switching module 208 may use any well-known techniques, algorithms, services, tools, modules and/or approaches for evaluating the state and condition of a wireless medium, and may take into consideration factors such as bandwidth, traffic, congestion, collisions, latency, utilization, signal strength, the number of devices on a given channel, etc.

In performing step 504, the adaptive switching module 208 may take into consideration the potential impact on the home wireless network 126 of downloading various video encodings having different resolutions of the same content, such as 4K versus 1080p versus 720p, etc. As will be appreciated by persons skilled in the relevant art(s), downloading higher definition encodings are more likely to cause delays in transmissions over the home wireless network 126, relative to downloading lower definition encodings.

The adaptive switching module 208 may also or alternatively take into consideration the potential impact on the home wireless network 126 of using wireless speakers 108 versus internal speakers 112, obtaining content via wired connections (such as from Blu-Ray/DVD 116) versus via the wireless network 126 (such as from content sources 124 or tablet/phone/computer 118), using lower rather than higher resolution audio encodings when wireless speakers 108 are being used to playback audio, etc.

Step 504 (and also step 506, described below) can be performed by the adaptive switching modules 208 in any or all of the media devices 106, or can be performed by the adaptive switching module 208 in a single one of the media devices 106 (which may be designated as the master adaptive switching module 208). For purposes of illustration and not limitation, assume that the adaptive switching module 208 in media device 106A is performing 504 and 506.

In 506, based on the analysis of the home wireless network 126 performed in 504, the adaptive switching module 208 in media device 106A may command and coordinate the operation of the other devices in the whole home entertainment systems 102, so as to improve the collective utilization of the wireless network 126 and thereby enhance the viewing experience of the users of whole home entertainment systems 102. Example actions taken by the master adaptive switching module 208 in step 506 may include any combination of:

- Requiring a media device 106 to obtain content from a source that does not require the home wireless network 126 for delivery (such as from Blu-Ray/DVD player 116 that is connected to media device 106B via HDMI port 114).
- Requiring a media device 126 to request a lower resolution video encoding of content, if the content is being delivered via the home wireless network 126 (from content sources 124 or tablet/phone/computer 118, for example). An embodiment for performing this operation is described above with reference to FIG. 4.
- Requiring a media device 126 to use its internal speakers 112 or wired external speakers 110 for audio playback.
- Requiring a media device 126 to use a lower resolution encoding of audio, if the audio is being transmitted via the home wireless network 126 to wireless speakers 108 for playback. The media device 126 may generate the lower resolution encoding of the audio from the received content using its audio processing module(s) 204, in a well-known manner.

In 508, the devices in the whole home entertainment systems 102 may operate as commanded (from step 506) when performing user commands. For example, if so commanded, media device 106C in display device 104C will obtain content from Blu-Ray/DVD player 116 rather than from a source over the home wireless network 126. If so commanded, media device 106A will request a 720p video encoding of content, rather than 4 k or 1020p. If so commanded, display device 104B will use its internal speakers 112 or wired external speakers 110 for audio playback, rather than access a wireless speaker 108 via the home wireless network 126. If so commanded, tablet/phone/computer 118 will request a lower resolution video encoding and/or use its internal speakers when playing content (in doing so, tablet/phone/computer 118 may operate according to an application 120 which functions as an adaptive switching module 208, and in this context, the tablet/phone/computer 118 may be considered to be a media device 106 and/or a display device 104).

The master adaptive switching module 208 in media device 106A may allow other devices to download higher resolution video and/or use wireless speakers 108 for playback. In this manner, the master adaptive switching module 208 coordinates the operations of the devices in the whole home entertainment system 102 so as to improve the collective utilization of the wireless network 126, and thereby enhance the experience for all of the users.

After step 508, control may return to step 504, wherein the condition of the home wireless network 126 may be reevaluated. Then, based on this reevaluated, current condition of the wireless network 126, the master adaptive switching module 208 may modify its commands to the other devices in the whole home entertainment system 102 (in step 506). In this manner, embodiments adaptively and continuously coordinate the operation of the devices in the whole home entertainment system 102, to improve collective utilization of the home wireless network 126 and thereby improvement the user experience.

Example Computer System

Figure 6:
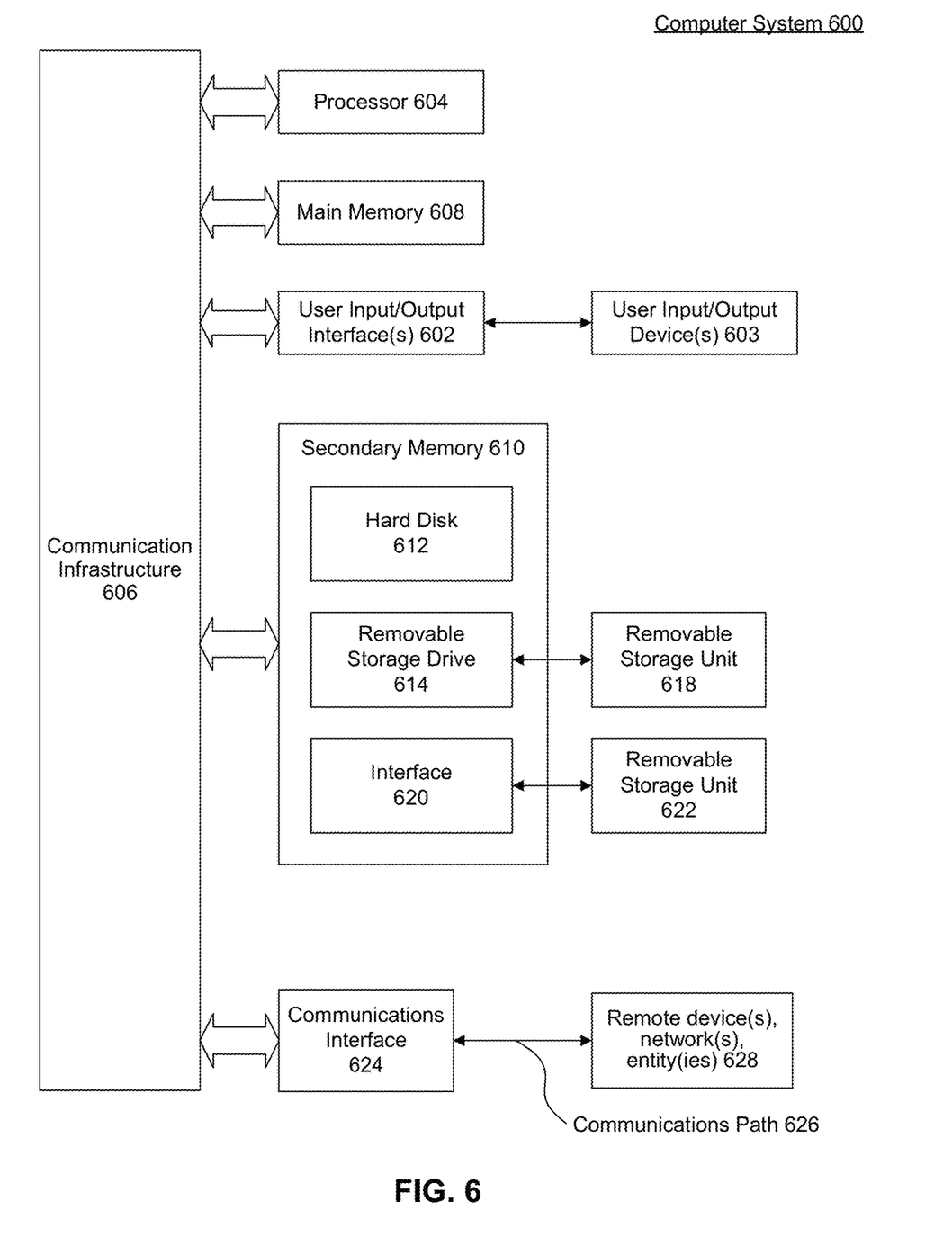
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 or portions thereof can be used to implement any embodiments of FIGS. 1-5, and/or any combination or sub-combination thereof.

Computer system 600 includes one or more processors (also called central processing units, or CPUs), such as a processor 604. Processor 604 is connected to a communication infrastructure or bus 606.

One or more processors 604 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device for synchronizing playback of audio and video associated with a content, comprising:
   a buffer;
   and at least one processor configured to:
      analyze a wireless network to characterize a current state of the wireless network, wherein the wireless network is configured to deliver data from the Internet to a plurality of devices connected to the wireless network and audio data from the media device to one or more wireless speakers;
      determine a transmission delay between the media device and a receipt of the audio data by the one or more wireless speakers;
      determine based on a size of a buffer at the media device and the transmission delay, a video encoding to request for the content;
      request the content from a content source accessible to the media device over the Internet, wherein the requested content comprises the selected video encoding and the audio;
      receive the requested content encoded with the requested video encoding from the content source over the Internet and via the wireless network;
      decode the received video at the media device;
      buffer, at the media device, the decoded video associated with the content and encoded with the requested video encoding in the buffer;
      transmit the audio, associated with the content, to the one or more wireless speakers via the wireless network;
      play the video encoding on a display device from the buffer; and
      play the audio on the wireless speakers.

2. The media device of claim 1, wherein to analyze, the at least one processor is configured to:
   analyze the wireless network to characterize a wireless link between the display device and the wireless speakers.

3. The media device of claim 1, wherein to analyze, the at least one processor is configured to:
    analyze the wireless network by taking into consideration potential impact on the wireless network of downloading various video encodings of the content, the video encodings having different resolutions.

4. The media device of claim 1, wherein to request, the at least one processor is configured to: request a video encoding that would not cause transmission delays over the wireless network in excess of a buffering capacity of the buffer.

5. The media device of claim 1, wherein the analysis is based at least in part on one of collisions or a count of how many of the plurality of devices are operating on a given channel of the wireless network.

6. The media device of claim 1, wherein to determine the transmission delay, the at least one processor is configured to:
    decode the audio data; and
    transmit the decoded audio data to the one or more wireless speakers.

7. A method for synchronizing playback of audio and video associated with a content, comprising:
    analyzing a wireless network to characterize a current state of the wireless network, wherein the wireless network is configured to deliver data from the Internet to a plurality of devices connected to the wireless network and audio data from a media device to one or more wireless speakers;
    determining a transmission delay between the media device and a receipt of the audio data by the one or more wireless speakers;
    determining based on a size of a buffer at the media device and the transmission delay, a video encoding to request for the content
    requesting the content from a content source accessible to the media device over the Internet, wherein the requested content comprises the requested video encoding and the audio;
    receiving the requested content encoded with the requested video encoding from the content source over the Internet and via the wireless network;
    decoding the received video at the media device;
    buffering, at the media device, the decoded video associated with the content and encoded with the requested video encoding in the buffer;
    transmitting the audio, associated with the content, to the one or more wireless speakers via the wireless network;
    playing the video encoding on a display device from the buffer; and
    playing the audio on the wireless speakers.

8. The method of claim 7, wherein the analyzing comprises:
    analyzing the wireless network to characterize a wireless link between the display device and the wireless speakers.

9. The method of claim 7, wherein the analyzing comprises:
    analyzing the wireless network by taking into consideration potential impact on the wireless network of downloading various video encodings of the content, the video encodings having different resolutions.

10. The method of claim 7, wherein the requesting comprises:
    requesting a video encoding that would not cause transmission delays over the wireless network in excess of a buffering capacity of the buffer.

11. A non-transitory computer-readable device having instructions stored thereon that, when executed by at least one computing device, cause the at least one computing device to perform operations to synchronize playback of audio and video associated with a content, the operations comprising:
    analyzing a wireless network to characterize a current state of the wireless network, wherein the wireless network is configured to deliver data from the Internet to a plurality of devices connected to the wireless network and audio data from a media device to one or more wireless speakers;
    determining a transmission delay between the media device and a receipt of the audio data by the one or more wireless speakers;
    determining based on a size of a buffer at the media device and the transmission delay, a video encoding to request for the content
    requesting the content from a content source accessible to the media device over the Internet, wherein the requested content comprises the requested video encoding and the audio;
    receiving the requested content encoded with the requested video encoding from the content source over the Internet and via the wireless network;
    decoding the received video at the media device;
    buffering, at the media device, the decoded video associated with the content and encoded with the requested video encoding in the buffer;
    transmitting the audio, associated with the content, to the one or more wireless speakers via the wireless network;
    playing the video encoding on a display device from the buffer; and
    playing the audio on the wireless speakers.

12. The non-transitory computer-readable device of claim 11, wherein the analyzing comprises:
    analyzing the wireless network to characterize a wireless link between the display device and the wireless speakers.

13. The non-transitory computer-readable device of claim 11, wherein the requesting comprises:
    requesting a video encoding that would not cause transmission delays over the wireless network in excess of a buffering capacity of the buffer.

14. A method for coordinating devices in a whole home entertainment system comprising a wireless network, to improve collective utilization of the wireless network and thereby enhance user experience, the method comprising:
    analyzing a wireless network to characterize a current state of the wireless network, wherein the wireless network is configured to deliver data from the Internet to a plurality of devices connected to the wireless network and audio data from the media device to one or more wireless speakers;
    determining a transmission delay between the media device and a receipt of the audio data by the one or more wireless speakers;
    determining based on a size of a buffer at the media device and the transmission delay, a video encoding to request for the content;
    based on the analysis, performing one or more actions to coordinate operation of electronic devices in the whole home entertainment system to thereby improve collective utilization of the wireless network, wherein the actions include any combination of:
        requiring that content be obtained from a source that does not require the wireless network for delivery;

requiring that a lower resolution video encoding of content be requested based on the determined video encoding, when the content is to be delivered via the wireless network;

requiring that internal speakers or wired external speakers be used for audio playback; and requiring that a lower resolution encoding of audio be used, when the audio is to be transmitted via the wireless network to wireless speakers; and causing the electronic devices to operate according to the actions.

15. The method of claim 14, wherein the analyzing comprises:

analyzing the wireless network to characterize wireless links between display devices and wireless speakers.

16. The method of claim 14, wherein the analyzing comprises:

analyzing the wireless network by taking into consideration potential impact on the wireless network of downloading various video encodings having different resolutions of the content.

17. The method of claim 14, wherein a)-c) are repeated to adaptively coordinate the electronic devices to improve collective utilization of the wireless network and thereby enhance user experience.

18. A non-transitory computer-readable device having instructions stored thereon that, when executed by at least one computing device, cause the at least one computing device to perform operations comprising:

analyzing a wireless network to characterize a current state of the wireless network, wherein the wireless network is configured to deliver data from the Internet to a plurality of devices connected to the wireless network and audio data from the media device to one or more wireless speakers;

determining a transmission delay between the media device and a receipt of the audio data by the one or more wireless speakers;

determining based on a size of a buffer at the media device and the transmission delay, a video encoding to request for the content;

based on the analysis, performing one or more actions to coordinate operation of electronic devices in a whole home entertainment system to thereby improve collective utilization of the wireless network, wherein the actions include any combination of:

requiring that content be obtained from a source that does not require the wireless network for delivery;

requiring that a lower resolution video encoding of content be requested based on the determined video encoding, when the content is to be delivered via the wireless network;

requiring that internal speakers or wired external speakers be used for audio playback; and requiring that a lower resolution encoding of audio be used, when the audio is to be transmitted via the wireless network to wireless speakers; and causing the electronic devices to operate according to the actions.

19. The non-transitory computer-readable device of claim 18, wherein the analyzing comprises:

analyzing the wireless network to characterize a wireless link between the display device and the wireless speakers.

20. The non-transitory computer-readable device of claim 18, wherein the analyzing comprises:

analyzing the wireless network by taking into consideration potential impact on the wireless network of downloading various video encodings having different resolutions of the content.

* * * * *

UNITED STATES PATENT AND TRADEMARK OFFICE
CERTIFICATE OF CORRECTION

PATENT NO. : 10,805,658 B2
APPLICATION NO. : 16/128565
DATED : October 13, 2020
INVENTOR(S) : Asnis et al.

Page 1 of 1

It is certified that error appears in the above-identified patent and that said Letters Patent is hereby corrected as shown below:

In the Claims

In Column 12, Lines 48-49, Claim 1: replace "the selected video encoding" with --the determined video encoding--.

In Column 14, Line 18, Claim 11: replace "content" with --content;--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*